US009247120B2

(12) United States Patent
Thomas et al.

(10) Patent No.: US 9,247,120 B2
(45) Date of Patent: *Jan. 26, 2016

(54) METHOD AND SYSTEM FOR PROVIDING REMOTE CONTROL FROM A REMOTE CLIENT COMPUTER

(75) Inventors: Monroe M. Thomas, Calgary (CA); Matthew James Stephure, Calgary (CA); Kevin Glen Robinson, Calgary (CA)

(73) Assignee: Calgary Scientific, Inc., Calgary (CA)

( * ) Notice: Subject to any disclaimer, the term of this patent is extended or adjusted under 35 U.S.C. 154(b) by 634 days.

This patent is subject to a terminal disclaimer.

(21) Appl. No.: 13/343,042

(22) Filed: Jan. 4, 2012

(65) Prior Publication Data

US 2012/0169874 A1 Jul. 5, 2012

Related U.S. Application Data

(60) Provisional application No. 61/429,573, filed on Jan. 4, 2011.

(51) Int. Cl.
*H04N 7/18* (2006.01)
*H04N 5/232* (2006.01)
*G06F 9/52* (2006.01)

(52) U.S. Cl.
CPC ........... *H04N 5/23206* (2013.01); *H04N 7/181* (2013.01); *G06F 9/52* (2013.01); *H04N 5/23216* (2013.01)

(58) Field of Classification Search
CPC H04N 5/23206; H04N 5/23216; H04N 7/181
USPC .................................................. 348/143, 153
See application file for complete search history.

(56) References Cited

U.S. PATENT DOCUMENTS 5,249,121 A   9/1993   Baum
6,151,621 A   11/2000  Colyer et al.
(Continued)

FOREIGN PATENT DOCUMENTS

CA   2646414   10/2007
CA   2697936   3/2009
(Continued)

OTHER PUBLICATIONS

Conference Schedule for ADASS XXI, European Southern Observatory, http://www.eso.org/sci/meetings/2011/adass2011/program/schedule.html#day2, Nov. 7, 2011, 4 pages.
(Continued)

*Primary Examiner* — Thai Tran
*Assistant Examiner* — Stephen Smith
(74) *Attorney, Agent, or Firm* — Meunier Carlin & Curfman LLC

(57) ABSTRACT

A method and system for remotely controlling a device via a computer network is provided. A client computer generates a client difference program indicative of a change of a state of the device last received from a server computer and transmits the same to the server computer. Upon receipt, the server computer executes the client difference program and determines an updated state of the device, generates control data indicative of the updated state of the device, provides the control data to the device, and generates and transmits a server difference program having encoded a difference between the state of the device and a state of the device last transmitted to the client computer. The client computer executes the server difference program for updating the state of the device last received from the server computer and for displaying the same in a human comprehensible fashion.

21 Claims, 11 Drawing Sheets

(56) References Cited

U.S. PATENT DOCUMENTS

| | | | |
|---|---|---|---|
| 6,342,906 B1 | 1/2002 | Kumar et al. | |
| 6,602,185 B1 | 8/2003 | Uchikubo | |
| 6,698,021 B1 | 2/2004 | Amini et al. | |
| 6,742,015 B1 | 5/2004 | Bowman-Amuah | |
| 6,938,212 B2 | 8/2005 | Nakamura | |
| 6,981,062 B2 | 12/2005 | Suryanarayana | |
| 6,996,605 B2 | 2/2006 | Low et al. | |
| 7,003,550 B1 | 2/2006 | Cleasby et al. | |
| 7,133,895 B1 | 11/2006 | Lee et al. | |
| 7,152,092 B2 | 12/2006 | Beams et al. | |
| 7,191,233 B2 | 3/2007 | Miller | |
| 7,254,634 B1 | 8/2007 | Davis et al. | |
| 7,287,054 B2 | 10/2007 | Lee et al. | |
| 7,346,616 B2 * | 3/2008 | Ramanujam | G06F 17/30578 707/610 |
| 7,356,563 B1 | 4/2008 | Leichtling et al. | |
| 7,363,342 B1 | 4/2008 | Wang et al. | |
| 7,533,146 B1 | 5/2009 | Kumar | |
| 7,624,185 B2 | 11/2009 | Miller et al. | |
| 7,676,506 B2 * | 3/2010 | Reinsch | G06F 8/68 707/695 |
| 7,810,089 B2 | 10/2010 | Sundarrajan et al. | |
| 7,984,115 B2 | 7/2011 | Tien et al. | |
| 8,010,901 B1 | 8/2011 | Rogers | |
| 8,065,166 B2 | 11/2011 | Maresh et al. | |
| 8,195,146 B2 | 6/2012 | Prakash et al. | |
| 8,239,773 B1 * | 8/2012 | Billman | G06F 17/30861 715/751 |
| 8,527,591 B2 | 9/2013 | Pirnazar | |
| 8,856,259 B2 | 10/2014 | Burckart et al. | |
| 8,909,703 B2 | 12/2014 | Gupta et al. | |
| 8,935,328 B2 | 1/2015 | Tumuluri | |
| 2002/0051541 A1 | 5/2002 | Glick et al. | |
| 2003/0179230 A1 | 9/2003 | Seidman | |
| 2004/0045017 A1 | 3/2004 | Dorner et al. | |
| 2004/0249885 A1 | 12/2004 | Petropoulakis et al. | |
| 2005/0114711 A1 * | 5/2005 | Hesselink | H04L 63/0209 726/4 |
| 2005/0114789 A1 | 5/2005 | Chang et al. | |
| 2005/0154288 A1 | 7/2005 | Wang | |
| 2006/0053380 A1 | 3/2006 | Spataro et al. | |
| 2006/0085245 A1 | 4/2006 | Takatsuka et al. | |
| 2006/0179119 A1 * | 8/2006 | Kurosawa | H04L 67/125 709/217 |
| 2006/0242254 A1 * | 10/2006 | Okazaki | H04L 63/101 709/208 |
| 2007/0143398 A1 | 6/2007 | Graham | |
| 2007/0244930 A1 * | 10/2007 | Bartlette | G06F 9/44505 1/1 |
| 2007/0244962 A1 | 10/2007 | Laadan et al. | |
| 2008/0052377 A1 | 2/2008 | Light | |
| 2008/0195362 A1 | 8/2008 | Belcher et al. | |
| 2008/0320081 A1 | 12/2008 | Shriver-Blake et al. | |
| 2009/0094369 A1 | 4/2009 | Woolbridge et al. | |
| 2009/0106422 A1 | 4/2009 | Kriewall | |
| 2009/0172100 A1 | 7/2009 | Callanan et al. | |
| 2009/0187817 A1 | 7/2009 | Ivashin et al. | |
| 2010/0017727 A1 | 1/2010 | Offer et al. | |
| 2010/0115023 A1 | 5/2010 | Peled | |
| 2010/0131591 A1 | 5/2010 | Thomas et al. | |
| 2010/0274858 A1 | 10/2010 | Lindberg et al. | |
| 2011/0047190 A1 * | 2/2011 | Lee | H04L 67/1095 707/803 |
| 2011/0058052 A1 * | 3/2011 | Bolton | H04M 1/7253 348/211.99 |
| 2011/0119716 A1 * | 5/2011 | Coleman, Sr. | H04N 7/181 725/62 |
| 2011/0128378 A1 * | 6/2011 | Raji | G06F 17/30873 348/143 |
| 2011/0154302 A1 | 6/2011 | Balko et al. | |
| 2011/0187652 A1 | 8/2011 | Huibers | |
| 2011/0191438 A1 | 8/2011 | Huibers et al. | |
| 2011/0191823 A1 | 8/2011 | Huibers | |
| 2011/0219419 A1 | 9/2011 | Reisman | |
| 2012/0210242 A1 | 8/2012 | Burckart et al. | |
| 2012/0210243 A1 | 8/2012 | Uhma et al. | |
| 2012/0233555 A1 | 9/2012 | Psistakis et al. | |
| 2012/0331061 A1 | 12/2012 | Lininger | |
| 2013/0046815 A1 | 2/2013 | Thomas et al. | |
| 2013/0120368 A1 | 5/2013 | Miller | |
| 2013/0159709 A1 | 6/2013 | Ivory et al. | |
| 2013/0208966 A1 | 8/2013 | Zhao et al. | |
| 2013/0297676 A1 * | 11/2013 | Binyamin | H04L 67/16 709/203 |

FOREIGN PATENT DOCUMENTS

| | | |
|---|---|---|
| CA | 2742779 | 6/2010 |
| EP | 1015068 | 4/2008 |
| WO | 98/25666 | 6/1998 |
| WO | 01/91482 | 11/2001 |
| WO | 2008/011063 | 1/2008 |
| WO | 2013/046015 | 4/2013 |
| WO | 2013/046016 | 4/2013 |
| WO | 2013/072764 | 5/2013 |
| WO | 2013/076554 | 5/2013 |
| WO | 2014/033554 | 3/2014 |

OTHER PUBLICATIONS

GoInstant shared web technology, http://website.s3.goinstant.com.s3.amazonaws.com/wp-content/uploads/2012/04/GoInstant-Shared-Web-Technology.pdf, 2012, 4 pages.

Press Release, Calgary Scientific Revolutionizes Application Sharing and Advanced Collaboration with PureWeb 3.0, Jun. 21, 2011, 3 pages.

Samesurf web real-time co-browser application, http://i.samesurf.com/i/0586021, 2009.

International Search Report and Written Opinion, dated May 17, 2013, in connection with International Application No. PCT/IB2012/002842.

International Search Report and Written Opinion, dated Feb. 12, 2013, in connection with International Application No. PCT/IB2012/002417.

International Search Report and Written Opinion, dated Jan. 30, 2013, in connection with International Application No. PCT/IB2012/001935.

International Search Report and Written Opinion, dated Jan. 23, 2013, in connection with International Application No. PCT/IB2012/001931.

International Search Report and Written Opinion, dated May 16, 2012, in connection with International Application No. PCT/IB2012/000009.

Federl, Pavol, "Remote Visualization of Large Multi-dimensional Radio Astronomy Data Sets," Institute for Space Imaging Science, University of Calgary, 2012, 22 pages.

Yang, Lili, et al., "Multirate Control in Internet-Based Control Systems," IEEE Transactions on Systems, Man, and Cybernetics: Part C: Applications and Reviews, vol. 37, No. 2, 2007, pp. 185-192.

International Search Report and Written Opinion, dated Jun. 9, 2014, received in connection with International Application No. PCT/IB2013/002776.

International Preliminary Report on Patentability, dated May 27, 2014, received in connection with International Application No. PCT/IB2012/002417.

European Search Report, dated Jun. 12, 2014, received in connection with European Application No. 12731899.6.

Supplementary European Search Report, dated Apr. 10, 2015, received in connection with European Application No. 12837201.8.

International Preliminary Report on Patentability and Written Opinion, dated Feb. 17, 2015, received in connection with related International Application No. PCT/IB2013/002776.

* cited by examiner

METHOD AND SYSTEM FOR PROVIDING REMOTE CONTROL FROM A REMOTE CLIENT COMPUTER

CROSS-REFERENCE TO RELATED APPLICATION

This application claims priority to U.S. Patent Application No. 61/429,573, entitled, "Method and System for Providing Remote Control from a Mobile Device," filed Jan. 4, 2011, the which is incorporated herein by reference in its entirety.

BACKGROUND OF THE DISCLOSURE

In numerous present day scenarios it may be desired to enable remote control of devices, such as a camera. For example, in the healthcare sector, a surgeon carrying out a surgical procedure on a patient in an operating room may require assistance from an expert that is unable to attend the surgery in the operating room. Cameras mounted in the operating room may capture the surgical procedure and transmit video data thereof to a computer for display to the expert.

State of the art surveillance systems such as, for example, PUREACTIV provide remote control of camera functions such as, for example, pan, tilt, and zoom, via a server computer connected thereto. Authorized users are enabled to access the surveillance system using a client computer connected to the server computer via a computer network such as the Internet for controlling the camera functions, receiving captured video data as well as accessing previously captured video data stored in a database.

Use of wireless handheld devices such as, for example, IPHONE and ANDROID devices has rapidly increased over the last couple of years to the extent that now nearly every professional owns at least one wireless handheld device. State of the art wireless mobile technology enables use of small wireless handheld devices to access the internet and download video streams.

SUMMARY OF THE DISCLOSURE

A method and system for providing remote control of a device over a computer network by a remotely connected client device is provided. According to some implementations, the method and system provide remote control of a camera from a wireless handheld device via a wireless computer network.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE DISCLOSURE

Unless defined otherwise, all technical and scientific terms used herein have the same meaning as commonly understood by one of ordinary skill in the art to which the disclosure belongs. Any methods and materials similar or equivalent to those described herein can be used in the practice or testing of the present disclosure.

While implementations of the disclosure will be described for remotely controlling functions of a camera in a clinical environment only for the sake of simplicity, it will become evident to those skilled in the art that the embodiments of the disclosure are not limited thereto, but are applicable in numerous other fields such as, for example, controlling of cameras of surveillance systems and cameras of telerobotic equipment, of remotely operated vehicles as well as the operation of the vehicle. Furthermore, while implementations of the disclosure will be described for video data transmission, it will become evident that the embodiments of the disclosure are also applicable for transmission of other data such as, for example, audio data or data captured by various types of sensors such as temperature sensors.

Figure 1:
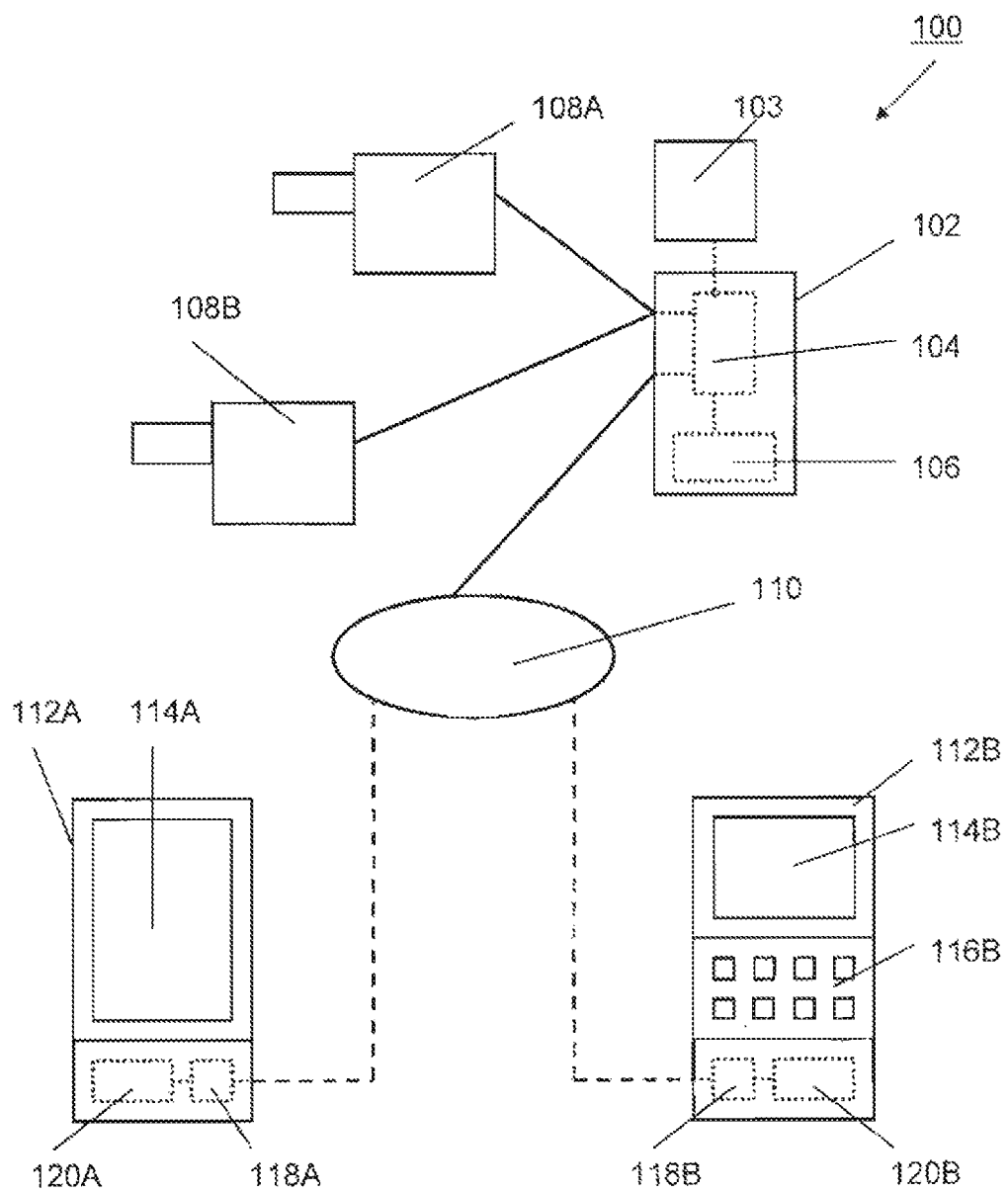
FIG. 1 is a simplified block diagram of a system for remotely controlling a device via a computer network.

Referring to FIG. 1, a system 100 for remotely controlling a device via a computer network is shown. The system comprises a plurality of client computers 112A, 112B connected via a communication network 110 to a server computer 102, for example, a central server computer of a surveillance system. Although the client computers 112A, 112B are shown as mobile devices, (e.g., wireless handheld devices), the client computers 112A, 112B may be any type of computing device, such as laptop/notebook computers, tablet devices, desktop computers, etc. As will be described below, the server computer 102 may perform one or more of many functions, such as functions associated with a video server, a gateway server, a recording service, etc. Cameras 108A, 108B may be connected to the server computer 102 using, for example, a Local Area Network (LAN) or the Internet. For example, in a clinical environment the cameras 108A, 108B are mounted in an operating room for capturing video data of a surgery performed therein. The system 100 may be made up of any combination of one or more of each of the server, the client device and the cameras.

The cameras 108A, 108B may be digital cameras such as, for example, digital Internet Protocol (IP) cameras, connected to a processor 104 of the server computer 102. Alternatively, analog cameras may be connected to the processor 104 of the server computer 102, for example, via a capture card for digitizing the analog video signal. Further alternatively, one or more cameras, for example, a web cam, or a camera of another mobile device such as an IPHONE are connected to a server computer via the Internet.

In some implementations, the system 100 may provide for video distribution, recording, and camera control capabilities. For instance, the cameras 108A, 108B may be statically defined at configuration time, such that their capabilities and control functionalities are known to the server computer 102. In such a system 100, the server computer 102 may be a video server or a gateway to access other video servers, or the server computer 102 may perform both functions.

The cameras 108A, 108B may be defined as a "video source." Video sources represent static sources of video data, whether through an Internet Protocol (IP) camera, or through an analog camera that is digitized via a capture card installed in, e.g., the server computer 102. The server computer 102 may enumerate available video sources and request the most recent frame captured from a particular video source, at a variety of resolutions and/or compression levels. The system 100 enables a camera control channel to be associated with a video source. The camera control channel is typically an RS232/422/485 serial data connection between, e.g., cameras 108A, 108B and the server computer 102. Multiple cameras may be addressed by the server computer 102 over the camera control channels. In some implementations, an IP connection may be provided over a LAN to a networked camera.

In some implementations, an abstract camera control protocol may be defined, which may be implemented on top of native protocols used by the various different models of cameras. As such, the abstract camera protocol may be used by the system 100 to define functions, such as a linear zoom model that allows point and click positioning and drag box zooming to be implemented on a remote user interface. Such absolute positioning commands mitigate lag effects due to latency from which relative positioning commands suffer. Optionally or alternatively, an add-on device may be interposed between the cameras 108A, 108B and the server computer 102 to control the cameras 108A, 108B. The add-on device may convert commands to the native camera protocols to implement functions of the cameras 108A, 108B.

Figure 3A:
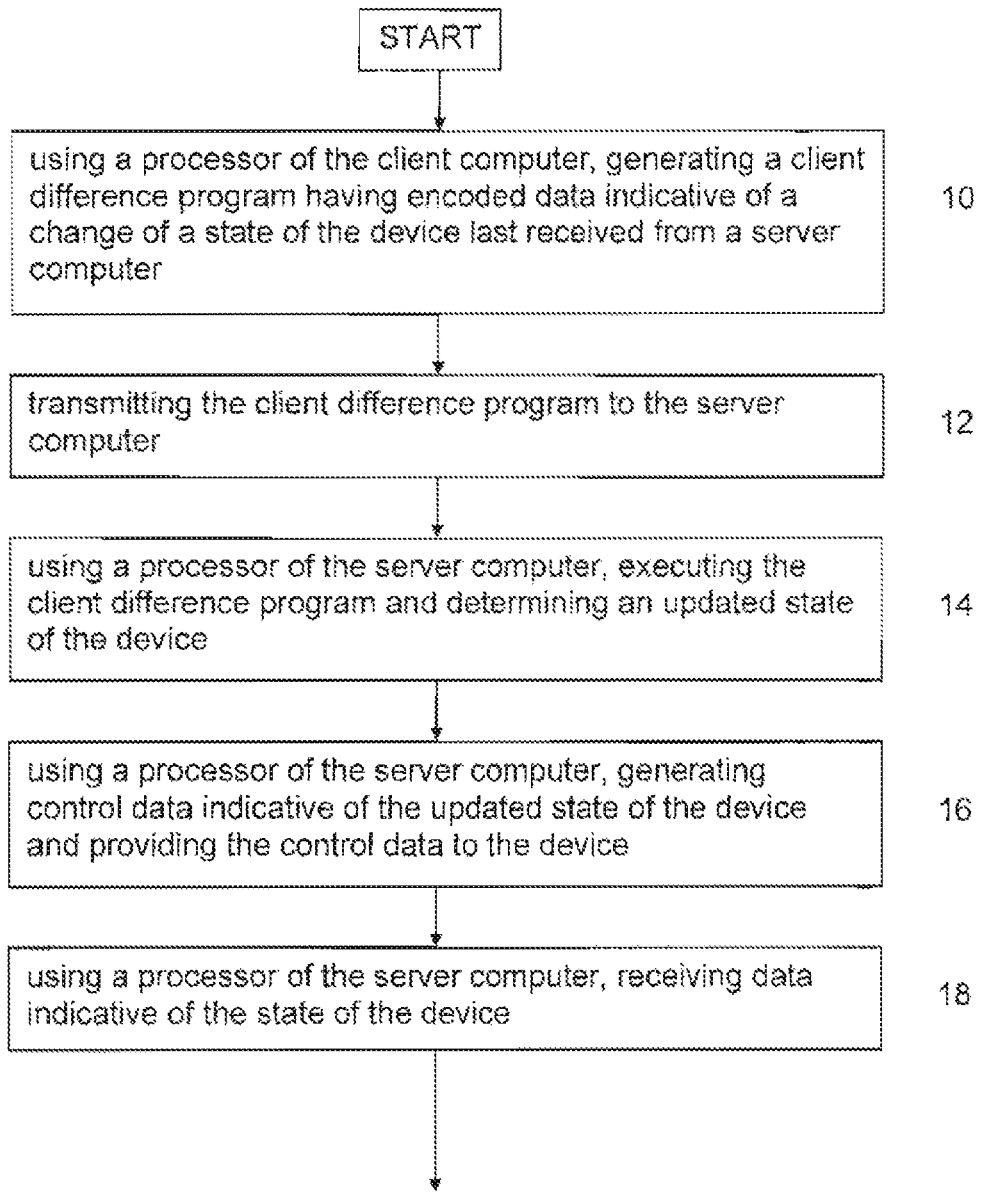
FIGS. 3a to 3c are simplified flow diagrams of a method for remotely controlling a device via a computer network.
Figure 3A:
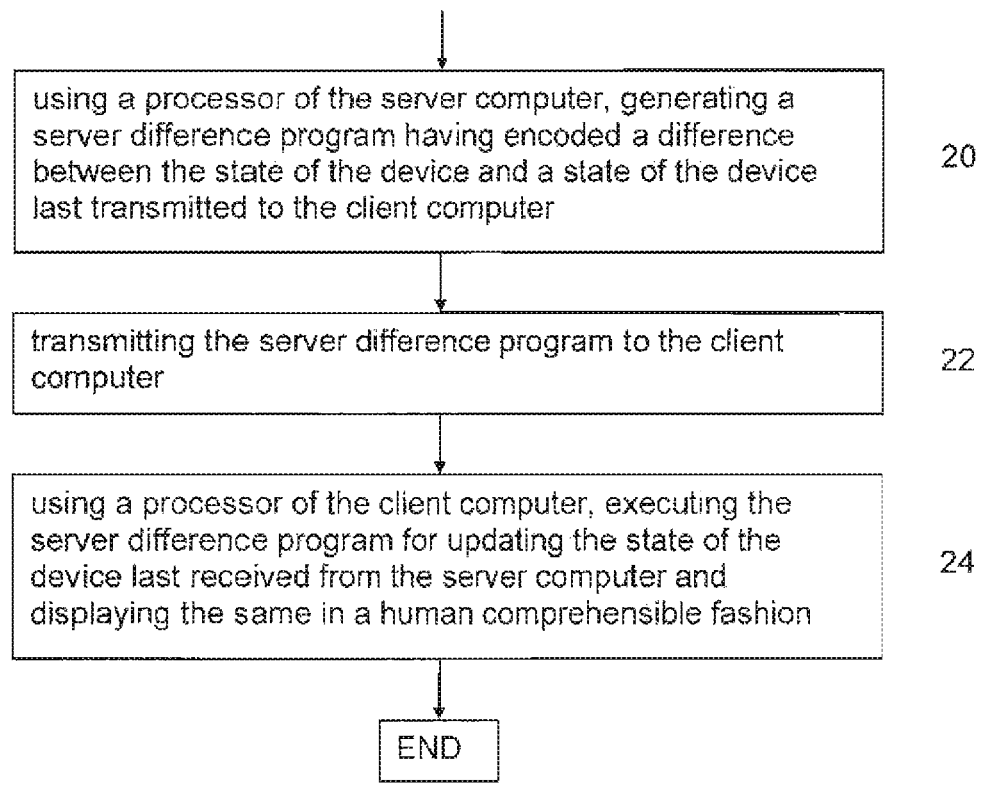
Figure 3B:
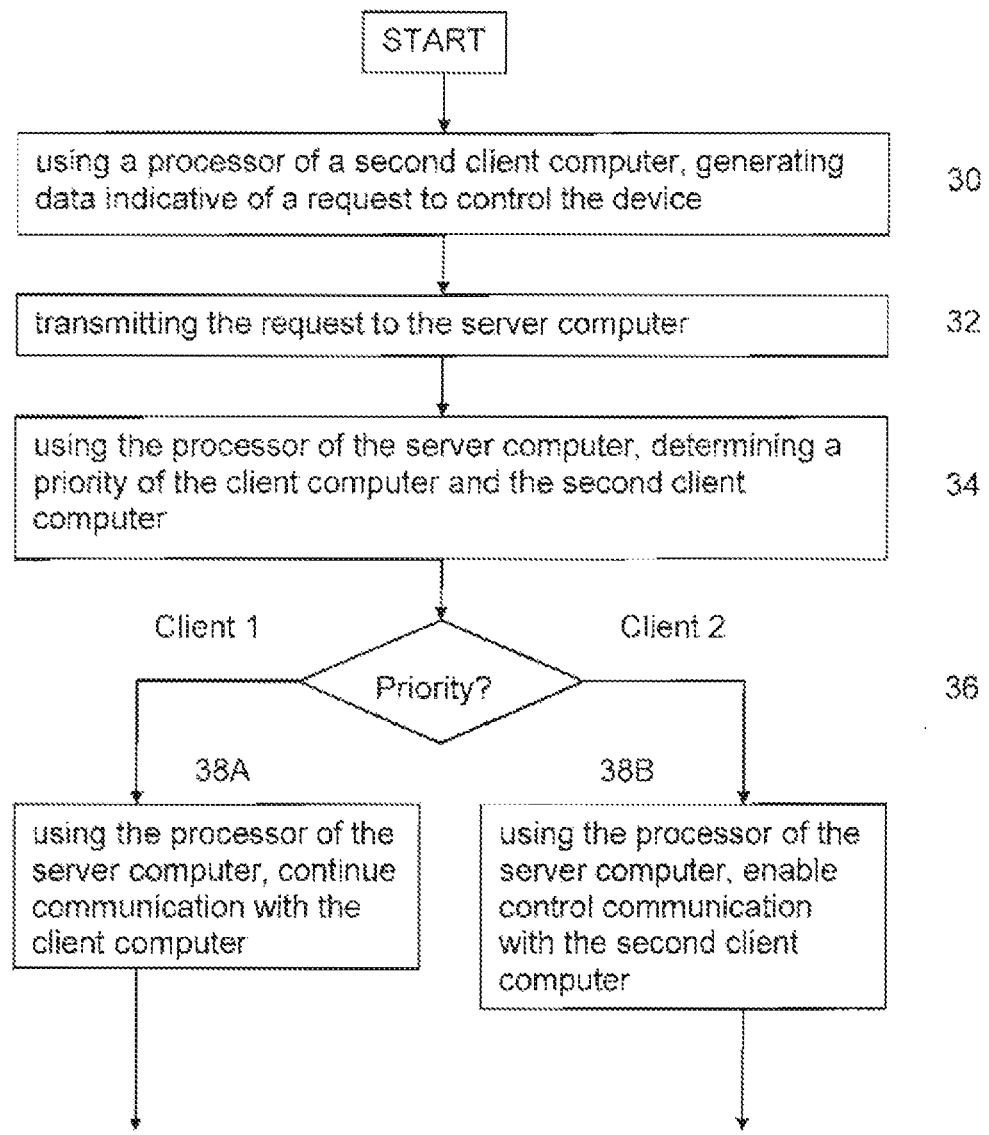
Figure 3B:
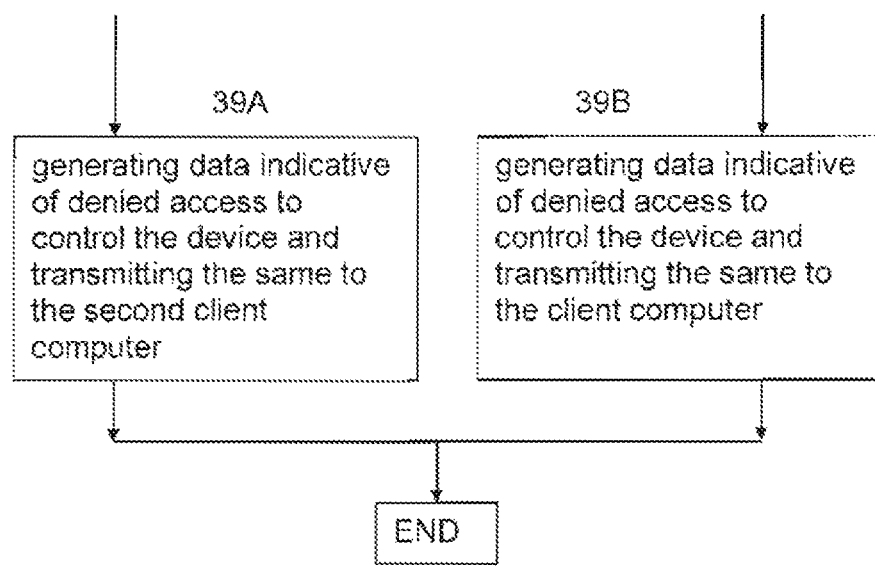
Figure 3C:
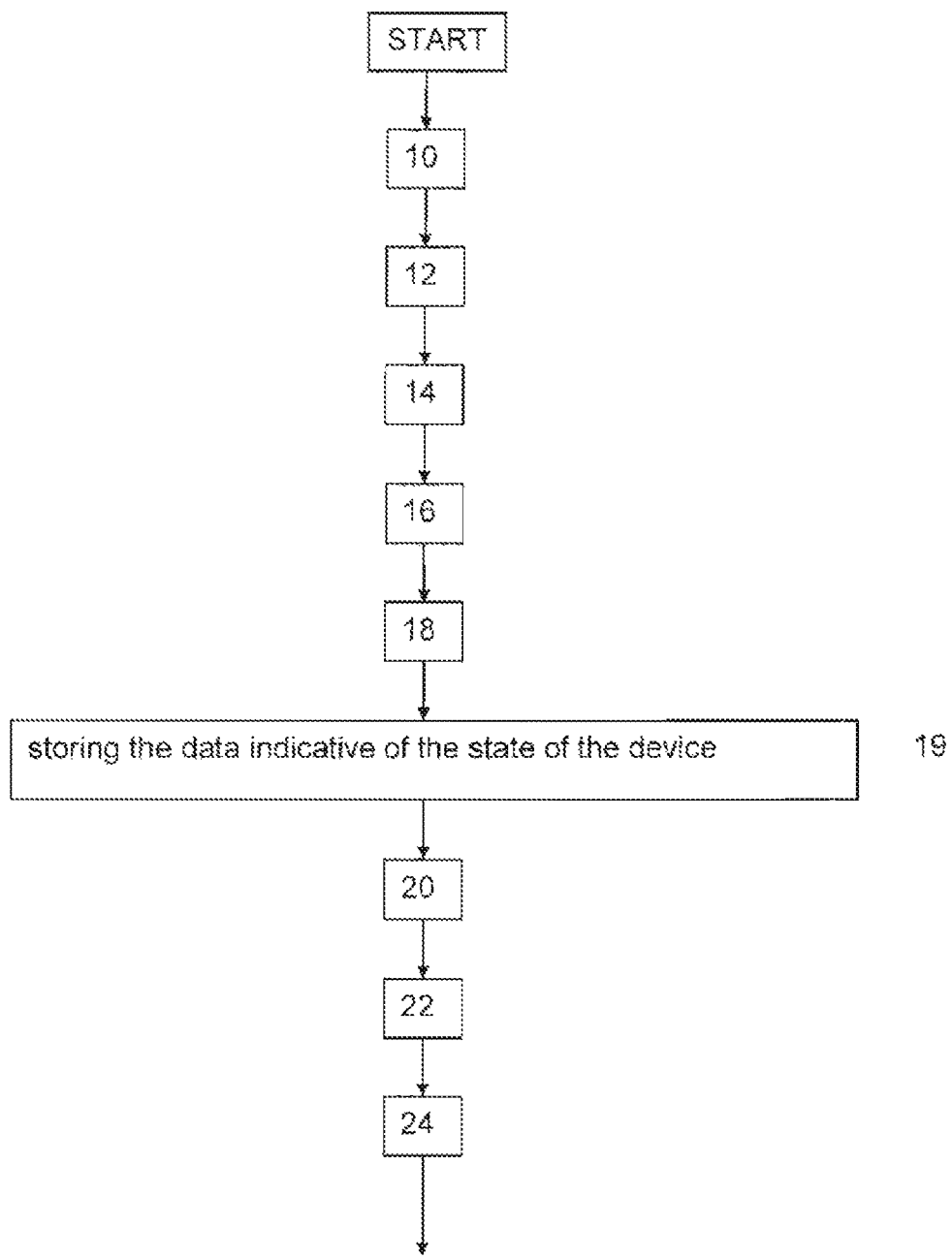
Figure 3C:
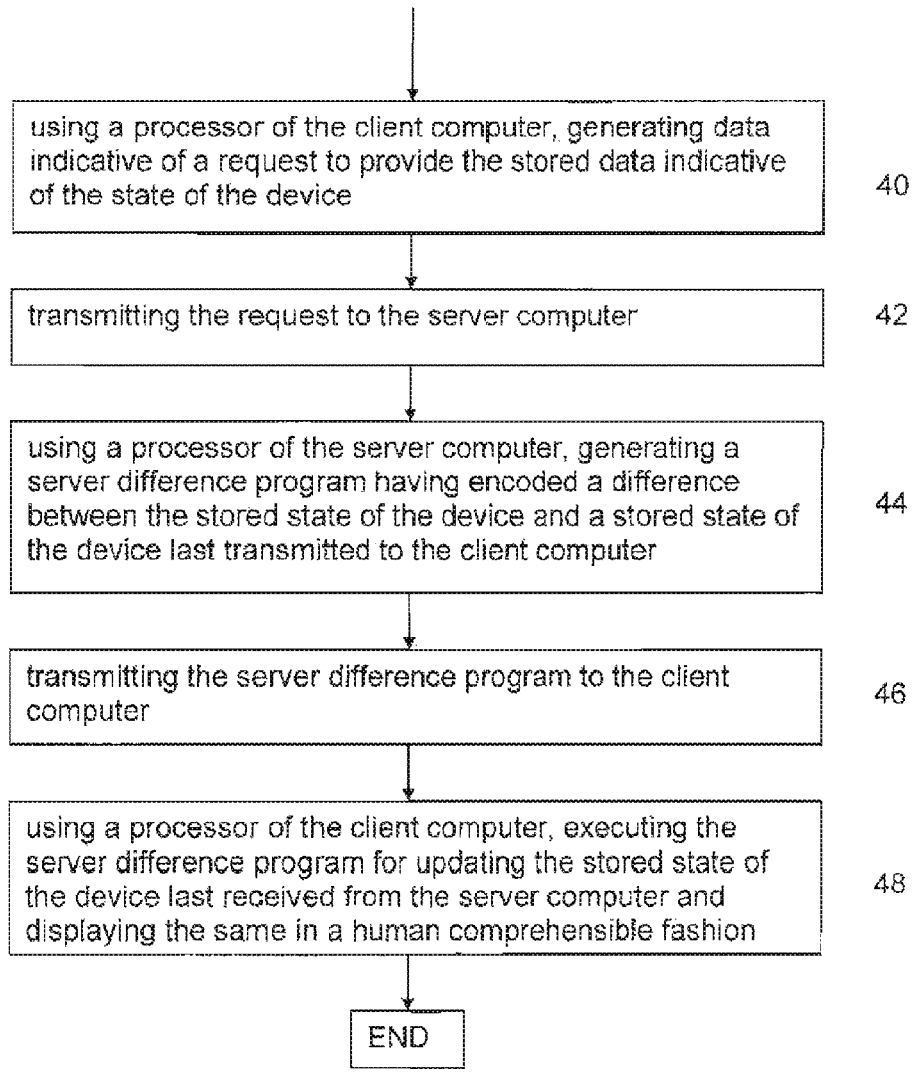

The camera control facilities of the system 100 may be exposed through a TCP based network port for use by multiple users, as discussed in further detail with regard to FIGS. 3a-3c. The camera functions such as, for example, pan, tilt, and zoom are controlled by executing commands, on the processor 104, a camera control program that stored in memory 106 of the server computer 102. The camera control program further controls capture and provision of video data in a substantially real-time fashion. According to aspects of the disclosure, remote control of the camera functions using, for example, client computers 112A, 112B is enabled by executing a server remote access program on the processor 104 of the server computer 102 and a respective client remote access program executed on a processor 118A, 118B of the client computer 112A, 112B. The server remote access program may be performed by executing executable commands stored in the memory 106 of the server computer 102, while the client remote access program is performed by executing executable commands stored in memory 120A, 120B of the client computer 112A, 112B. An example of the server remote access program is PUREWEB, available from Calgary Scientific, Inc. of Calgary, Alberta.

In addition to the above camera control functions, the following capabilities may be provided by the system 100: enumeration of the abstract camera control capabilities associated with each video source; requesting permission to acquire control of a camera, as only one user may control a camera at a time; sending various camera control commands according to the abstract protocol if control has been acquired; and releasing control of a camera after a timeout period or if a user with higher priority requests control In some implementations, the video source (e.g., cameras 108A, 108B) may be recorded by a recording service running on, e.g., the server computer 102 or another computer in communication with the server computer 102. For example, the recording service may specify a maximum time to store video or a minimum disk space to maintain as free space. If the video stream is being recorded, a frame captured at certain time in the past may be requested and delivered to the recording service for storage. The recording service may delete video in time-based chunks from oldest to newest across all video sources, define a policy to mark portions of video to prevent deletion, and/or export segments of recorded video as an AVI (or other video format) file. The recording service may store video either in its native form as received from the cameras 108A, 108B or the computer network 110, or may transcode the video to use, e.g., JPEG encoding. The frame frequency may be decimated to reduce storage requirements.

In some implementations, the system 100 of FIG. 1 may be used to provide a dynamic point-to-multipoint video distribution system. The system 100 may provide security and audit capabilities for, e.g., medical or other applications requiring audit trails. The system 100 may provide dynamic publishing of video from a variety of sources to the server computer 102. The sources may include dynamic video sources, such as client computers 112A, 112B (e.g., mobile phones, laptops), remote IP cameras, and third-party video systems. Such dynamic video sources may not require a static configuration that is predefined at the server computer 102; rather the dynamic video sources may pass configuration information in a client difference program to the server computer 102, as described below. The server computer 102 may route the received video to the recording service for recording or to the video server for future distribution.

The system 100 may provide a mechanism for client computers to subscribe to video from the server computer 102. Such video may be recorded video available through the recording service, or live video being provided by the video server. The client computers 112A, 112B may communicate with the server computer 102, as an interface, which will delegate communications to and from the video server and/or recording service.

Additionally or alternatively, the processor 104 may execute an application program that is stored in memory 106 of the server computer 102. For purposes of the present disclosure, the application program may be any program. The server computer 102 may enable remote access to the application program, such that the client computers 112A, 112B may interact separately or collaboratively with the application program over the communication network 110. The application program, however, may not directly support video. In accordance with some implementations, the sever computer 102 may inject video frames into the communications involving the application program and the client computers 112A, 112B.

In some implementations, the server computer 102 may provide a security and authentication service. The sever computer 102 may include security policies and audit provisions such that in, e.g., medical applications, video can be safely collected with confidence that no one will be able to see or replay the video without consent. Furthermore, a subject may specify a policy regarding how long the recorded video may be kept, whether copies of recordings may be made, and who can view recordings in the future, as well as have an audit trail maintained of any copies made or viewings of recordings for forensic security purposes.

With reference now to FIGS. 2a to 2d, communication between the client computer 112A, 112B and the server computer 102 is provided as communication between the server remote access program and the client remote access program via, for example, a wireless or wired computer network. The server remote access program communicates with the camera control program while the client remote access program communicates with a user interaction program such as, for example, a web browser for: displaying data such as, for example, video data and camera control data; and for receiving user input data for controlling the camera or video replay functions from, for example, a touch screen of a handheld wireless device, from a mouse or keyboard, or by voice command. The server remote access program and the client remote access program may be implemented using standard programming languages and communication is enabled using standard communication technologies such as, for example, Hyper Text Transfer Protocol (HTTP), Virtual Private Networks (VPN), and Secure Socket Layers (SSL) which are well known to those skilled in the art. Provision of the server remote access program and the client remote access program enable implementation of aspects of the disclosure as a retrofit to existing technologies on the server side as well as on the client side. Thus, the server remote access program may control storage and replay of the captured video data. Further, the server remote access program may control access for controlling the cameras 108A, 108B as well as access to the real-time video data and the stored video data.

Communication between the server remote access program and the client remote access program may be based on transmission of difference programs having encoded data indicative of a change of state of the camera 108A, 108B, as will be described herein below. The difference programs comprise executable commands for execution by a processor. The encoded data are, for example, indicative of: a path to the change in the state of the camera; a type of the change; and a value of the change. The path to the change is, for example, one of the camera functions such as pan, tilt, and zoom. The type of change is, for example, a "modification", with a new value is for one of the camera function. An example of a difference program is:

Path="Camera Function/Zoom"
Type="Modification"
Value="50"

Figure 2A:
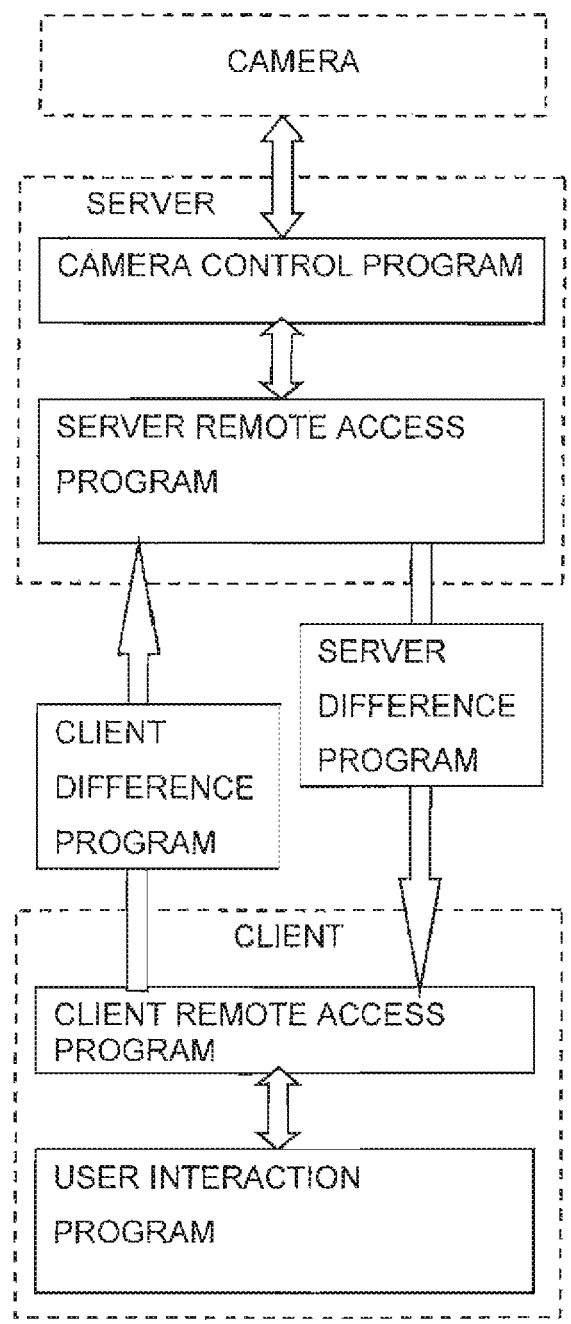
FIGS. 2a to 2d are simplified block diagrams illustrating communication between a client computer and a server computer of the system shown in FIG. 1.
Figure 2B:
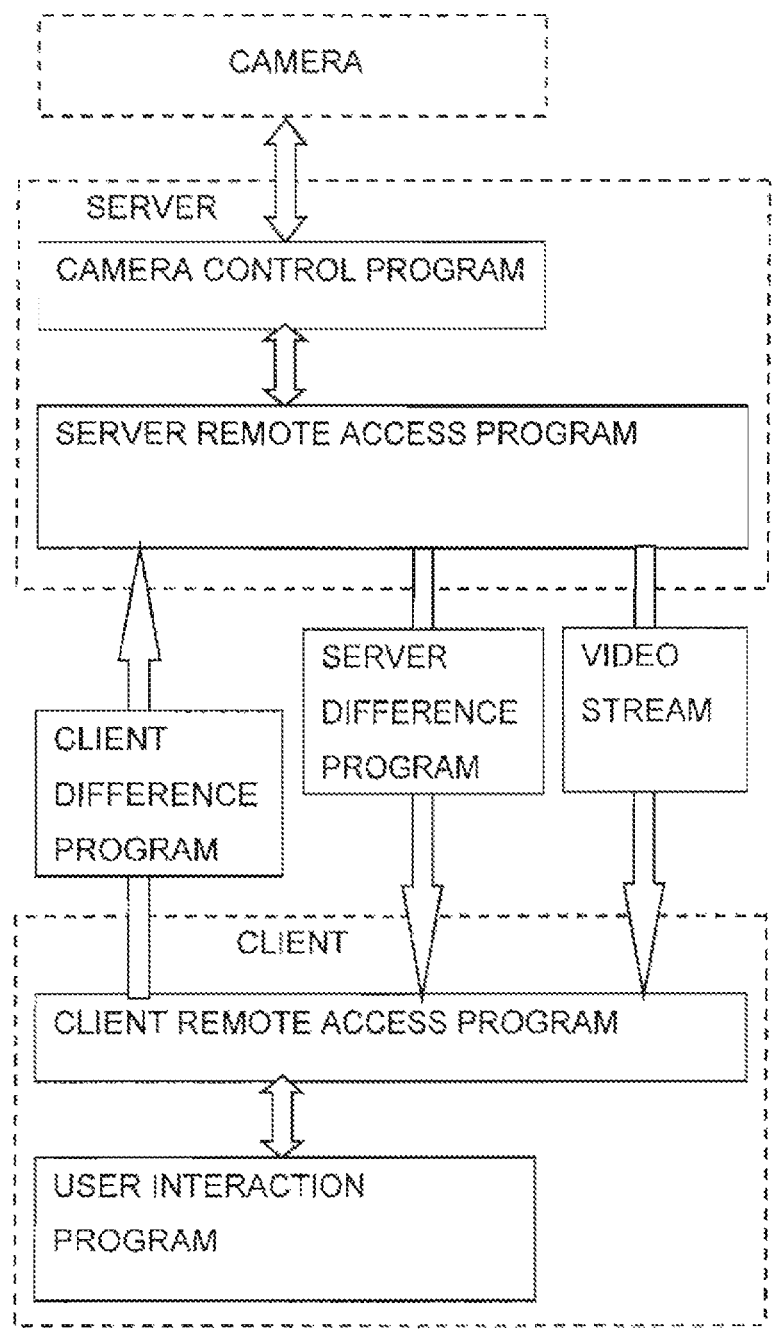
Figure 2C:
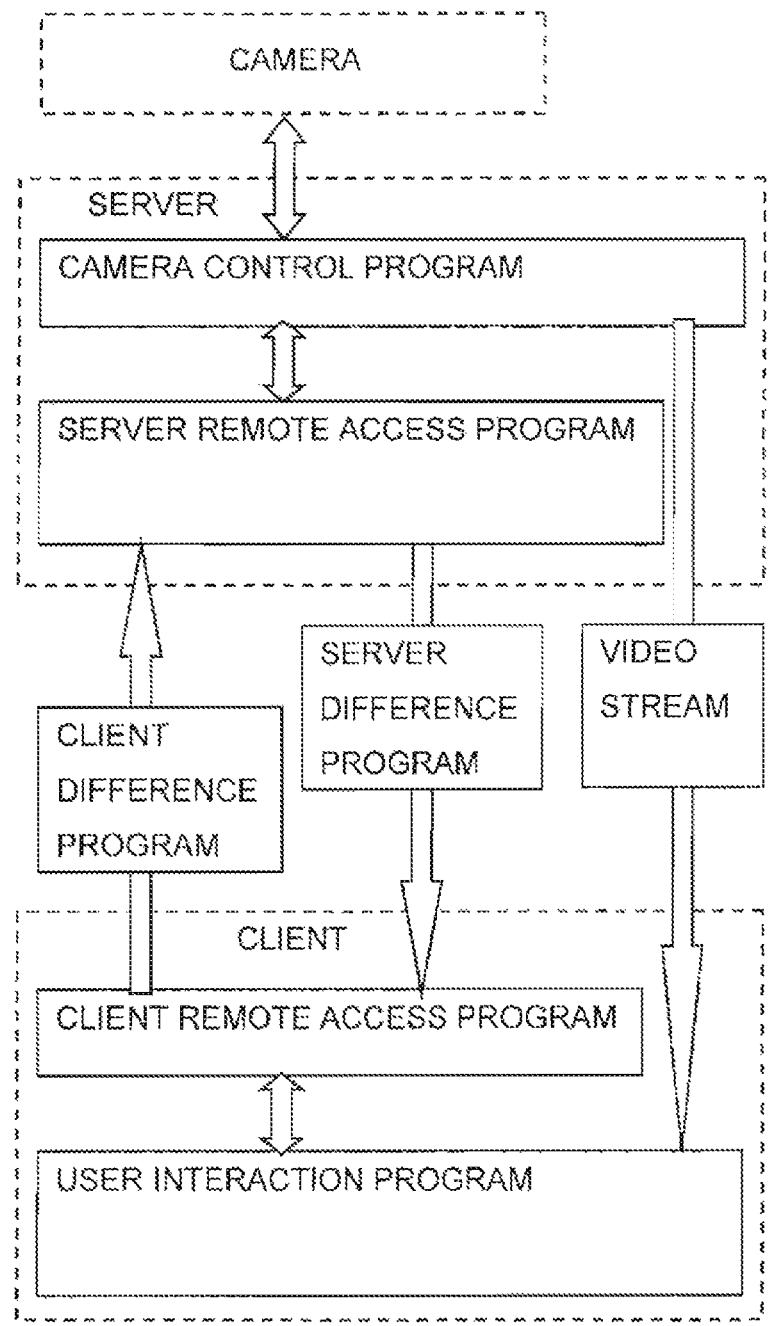

The server remote access program may generate "view data" of the video data captured by the camera and transmit the same in a fashion according to hardware capabilities of the client computer 112A, 112B. For example, the "view data" may be determined in accordance with a processing capacity, memory size, type of graphical display, and type of user interface of the client computer 112A, 112B. A such, "view data" generated and transmitted for a laptop computer are different from "view data" generated and transmitted for a handheld device such as, for example, an IPHONE. Generation of "view data" enables a substantial reduction in the amount of data transmitted (i.e., results in a savings in bandwidth utilization) for display on the small display of a handheld wireless device. A further reduction of the amount of transmitted data is realized by transmitting only image data related to pixel values that have changed between successive image frames of the video data using difference programs as illustrated in FIG. 2a. Typically, the values of only a portion of the image pixels change between successive image frames, thus enabling a substantial reduction in transmitted data. In addition, the client computers may cache image data received from the server computer 102. By providing a cache, the client, when requesting a most recent frame captured from a particular video source, may utilize locally cached image data to reduce the amount of video date transmitted by the server computer 102. Logic may be provided on the client computer 112A, 112B to determine what cached image data may be reused to provide a complete image to the user of the client computer.

Alternatively, the video data are directly transmitted as a video stream of successive image frames between the server remote access program and the client remote access program or the camera control program and the user interaction program. Direct transmission of the video data as a video stream reduces the latency between image capture and display at the cost of increased bandwidth needed for the data transmission to the client computer 112A, 112B. The client computer 112A, 112B may access a TCP-based network port to retrieve video. In some implementations, the video may be simultaneously accessed by multiple client computers at the enumerated TCP-based network port.

In some implementations, live video may be distributed as individual JPEG frames with configurable resolution and compression quality. Thus, the frames are not streamed, rather each frame is requested by the client computer 112A, 112B. While this may limit the maximum frame rate achievable, it offers a substantially reduced latency between capture at the image source and distribution with no buffering required.

Figure 2D:
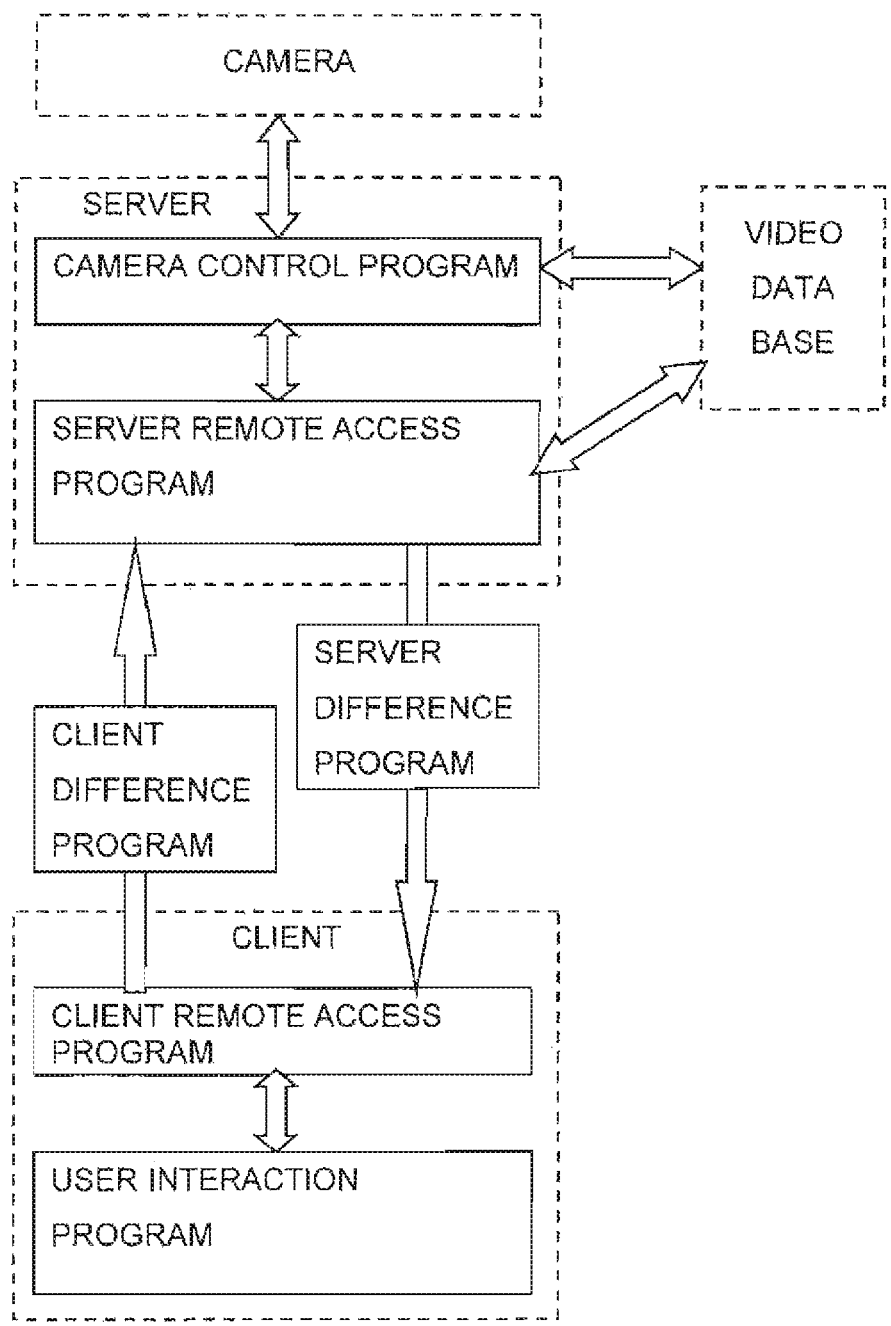

Referring to FIG. 2d, the video data may be stored in a video database 103 connected to the server computer 102 enabling replay of the video data. The camera control program provides the video data to the recording service or video database for storage therein, retrieves the same in dependence upon a request received from the server remote access program and provides the retrieved video data to the server remote access program for transmission to the client computer 112A, 112B. Alternatively, the server remote access program may directly retrieve the video data from the video database. Further alternatively, the server remote access program may store the data in the video database 103 upon receipt from the camera control program. In some implementations, the video server may include a buffer that plays back the video at its original rate where the client requests sample the buffer as the requests are received.

Referring to FIGS. 3a to 3c, a method for remotely controlling a device via a computer network is shown. Using a processor 118A, 118B of the client computer 112A, 112B, a client difference program having encoded data indicative of a change of a state of the device last received from the server computer 102 is generated (10) and transmitted (12) to the server computer 102. For example, the data are indicative of a change of pan, tilt, or zoom of the camera 108A, 108B. Using the processor 104 of the server computer 102, the client difference program is executed and an updated state of the device is determined (14). The processor 104 then generates control data indicative of the updated state of the device and provides the control data to the device (16). For example, the updated state of the device is determined by the server remote access program while the control data are determined by the camera control program. The device executes the control data—for example, zooms in towards an object—and sends data indicative of the state of the device—for example, the new focal length—to the processor 104 of the server computer 102. Upon receipt (18), the processor 104 of the server computer 102 generates (20) a server difference program having encoded a difference between the state of the device and a state of the device last transmitted to the client computer 112A, 112B and transmits (22) the same to the client computer 112A, 112B. Upon receipt, the processor 118A, 118B of the client computer 112A, 112B executes (24) the server difference program, updates the state of the device last received from the server computer accordingly and displays the same on display 114A, 114B in a human comprehensible fashion.

Optionally, when transmitting video data to the client computer 112A, 112B generation and transmission of client difference programs are omitted, i.e. the video data are transmitted as a succession of server difference programs having encoded data indicative of a change in pixel values between consecutive image frames of the video data. For example, the data indicative of a change of zoom of the camera 108A, 108B are based on a linear zoom model allowing point and click positioning and drag box zooming using the graphical user interface 114A of the client computer 112A.

Referring to FIG. 3b, a method for managing access for remotely controlling a device via a computer network according to a preferred embodiment of the disclosure is shown. For example, user A of client computer 112A is controlling the device and user B of client computer 1128 provides input data indicative of a request to control the device. Upon receipt of the input data the processor 118B of the client computer 112B generates (30) data indicative of a request to control the device and transmits (32) the request to the server computer 102. Upon receipt of the request the processor 104 of the server computer determines (34) a priority of the client computer 112A and 112B. For example, data indicative of a priority of each of a plurality of users may be stored in a database in the form of a look-up table which is managed by an administrator of the remote control system. At 34, the processor accesses the look-up table and retrieves the data indicative of the priority of the user.

If user A has priority (36) the processor 104 of the server computer 102 continues (38A) the communication with the client computer 112A allowing user A to control the device. The processor 104 of the server computer 102 further generates (39A) data indicative of denied access to control the device and transmits the same to the client computer 112B. If user B has priority (36) the processor 104 of the server computer 102 enables (38B) the communication with the client computer 112B allowing user B 10 control the device. The processor 104 of the server computer 102 further generates (39B) data indicative of denied access to control the device and transmits the same to the client computer 112A.

Functions related to manage user access, i.e., the steps 34 to 39, are may be by executing the server remote access program, thus limiting the camera control program to communicate the commands to the camera and provide the captured video data. In addition, while user A or user B is controlling the device, other are able to view the video capture or provided by device by either accessing the video stream or requesting frames of image data, as noted above.

Of course there are numerous variations of provision of user access possible. For example, user control may be restricted to specific devices of a plurality of devices connected to the server computer such as: user A is enabled to control camera 108A while user B is enabled to control camera B. In another example, user A is enabled to control the devices while user B is only enabled to receive the video data, etc. Yet further, user A and user B may receive video data. One of ordinary skill in the art would now recognize that other variations of access and presentation of video are possible where multiple devices are communicating with the server computer 102.

Referring to FIG. 3c, a method for remotely controlling a device via a computer network is shown. The process of controlling the device and transmission of the video data is the same as illustrated in FIG. 3a, with same reference numerals referring to same steps. At 19, the video data are stored in memory, for example, in memory 106 of the server computer 102 or in video database 103 connected to the server computer 102.

At 40, the processor 118A, 118B of the client computer 112A, 112B receives input data indicative of a request to provide the stored video data and generates data indicative thereof, for example, encoded in a client difference program and transmits (42) the same to the server computer 102. The request is, for example, indicative of video data captured by which camera and a start time of the video data. Optionally, the user is provided with a menu for the video data selection displayed on the user interaction interface 114A, 114B. Upon receipt, the processor 104 of the server computer 102 retrieves the stored video data and generates (44) a server difference program having encoded a difference between the stored state of the device and the stored state of the device last transmitted to the client computer 112A, 112B, i.e. a difference between consecutive image frames of the video data, and transmits (46) the same to the client computer 112A, 112B. Upon receipt, the processor 118A, 118B of the client computer 112A, 112B executes (48) the server difference program, updates the state of the device last received from the server computer accordingly and displays the same on display 114A, 114B in a human comprehensible fashion. Optionally, when transmitting video data to the client computer 112A, 112B generation and transmission of client difference programs are omitted, i.e. the video data are transmitted as a succession of server difference programs having encoded data indicative of a change in pixel values between consecutive image frames of the video data.

Alternatively, the camera control program and the server remote access program are integrated in one program for execution on the processor 104 of the server computer 102. Further alternatively, the client remote access program and the user interaction program are integrated into one program for execution on the processor 118A, 118B of the client computer 112A, 112B.

Further, as introduced above, the methods of FIGS. 3a-3c may enable remote control and/or video access to a plurality of client computers 112A, 112B, which are, for example, simultaneously, connected to the server computer 102 via the communication network 110. In such an implementation, each client computer may communicate a respective client difference program to the server computer 102 that represents changes made at the particular client computer. The client difference programs may be executed at the server computer 102 for determining control data to update a state of the device, followed by generating a second server difference program reflecting the updated state of the device. The plurality of client computers may, thus simultaneously and collaboratively control the device. Alternatively, the plurality of client computers may be prioritized, as in FIG. 3b. The second server difference program may be communicated to each of the plurality of client device to update the displays thereof. Thus, each connected client computer receives live or recorded video while control operations are being performed.

Implementation of the methods for remotely controlling a device via a computer network is not limited to the computer network architecture illustrated in FIGS. 1 and 2a to 2d. For example, the server remote access program may be executed on a processor of a first server computer while the camera control program may be executed on a processor of a second server computer connected thereto, for example, via a computer network such as the Internet. Further, the system 100 may be used to control multiple cameras in communication with multiple server computers. For example, each of the multiple server computers may be accessible at a different network address (e.g., a Uniform Resource Locator (URL)) to which the client access program man connect. Further, the video database may be connected to the first server computer and accessed by the server remote control program, leaving the second server computer and the camera control program for controlling the cameras and providing the captured video data. Still further, remote control may be effected by any type of client computer, i.e., mobile device, desktop computer, laptop/notebook computer, a tablet device, etc.

The present disclosure has been described herein with regard to several implementations. However, it will be obvious to persons skilled in the art that a number of variations and modifications can be made without departing from the scope of the disclosure as described herein.

What is claimed is:

1. A method of providing remote control of a device, comprising:
providing a remote connection to a server computer executing a server remote access program that is accessible by a client computer executing a client remote access program, the server computer being in communication with a control program that controls the device by communicating control data over a control communication link, and the server remote access program establishing the remote connection with the client remote access program;
communicating, by the remote connection, a client difference program containing encoded data representing a change in a state of the device made by the client computer since the state of the device was last received by the server computing device;
communicating, by the remote connection, a server difference program containing encoded data representing a change in a state of the device made by the control program since the state of the device was last received by the client computing device; and
communicating, in accordance with information in the difference program, the control data to the device over the control communication link; and
synchronizing the state of the device using the difference program between the control program and the client computer.

2. The method of claim 1, wherein the device is a camera.

3. The method of claim 2, further comprising:
generating view data of image data captured by the camera; and
transmitting the view data to the client computer in accordance with hardware capabilities of the client computer.

4. The method of claim 3, wherein the hardware capabilities comprising one of processing capacity, memory size, type of graphical display, and type of user interface.

5. The method of claim 4, further comprising causing the client computer to display a predetermined portion of the state of the control program.

6. The method of claim 2, further comprising controlling functions of the camera using the control data.

7. The method of claim 6, where the functions of the camera comprise one of pan, tilt and zoom.

8. The method of claim 2, further comprising transmitting the image data as a video stream of successive image frames between a server remote access program executing on the server computer and a client remote access program executing on the client computer.

9. The method of claim 2, further comprising transmitting only image data related to pixel values that have been changed between successive image frames generated by the camera.

10. The method of claim 2, wherein plural client computers control functions of the camera, the method further comprising:
determining a prioritization of the plural client computers;
managing access to the camera in accordance with the prioritization; and
providing image data from the camera to each of the plural client computers during the control of the functions of the camera.

11. The method of claim 1, further comprising capturing changes in the state of the control program in the difference program since a last difference program was communicated by the client computer or the server computer.

12. The method of claim 1, further comprising:
providing a server remote access program executing on a server computer, the server remote access program being in communication with the control program;
providing the remote connection to a client remote access program executing on a client computer;
communicating the difference program over the remote connection between the server remote access program and the client remote access program.

13. The method of claim 1, further comprising managing access of plural client computers that remotely control the device.

14. The method of claim 13, further comprising:
receiving a request from at least one of the plural client computers at the server computer;
determining a priority of the plural client computers in accordance with information stored in a database; and
allowing a client computer having a predetermined priority to control the device.

15. The method of claim 13, further comprising providing a functionality of the device to the plural client computers while at least one of the plural client computers remotely controls the device.

16. A non-transitory computer readable medium comprising computer executable instructions that when executed by a processor of a computing device perform a method of providing remote control of a device, comprising:
providing a remote connection to accessible by a client remote access program to enable remote access of the device using a control program;
instantiating a server remote access program on a server computer that is in communication with the control program and the client remote access program;
communicating, over the remote connection, a client difference program containing encoded data representative of changes in a state of the device since the state of the device was last received by the server computer;
communicating, over the remote connection, a server difference program containing encoded data representative of a state of the device since the state of the device was last received by a client computing device associated with the client remote access program;
communicating, in accordance with information in the difference program, control data over a control communication link to the device; and
synchronizing the state of the device using the difference program between the control program and a client computer.

17. The non-transitory computer readable medium of claim 16, further comprising instructions for:
managing access of plural client computers that remotely control the device in accordance with a predetermined priority.

18. The non-transitory computer readable medium of claim 17, further comprising instructions for providing a functionality of the device to the plural client computers while at least one of the plural client computers remotely controls the device.

19. The non-transitory computer readable medium of claim 16, further comprising instructions for generating the control data from the data contained in the difference program representative of the state of the device.

20. A method of providing remote control of a camera, comprising:

providing a server remote access program on a server computer, the server remote access program being in communication with a camera control program that controls the camera via a control communication link;

providing a remote connection to a client remote access program executing on a client computer, the remote connection enabling remote access to the control program;

communicating a difference program containing encoded data representative of a state of the camera over the remote connection between the client computer and the server computer and between the server computer and the client computer, the difference program capturing changes in the state of the device since the state of the device was last received by the server computer and the client computer, respectively;

communicating image data from the camera to the client computer;

communicating, in accordance with information in the difference program, control data to the camera to affect operation of the camera; and synchronizing the state of the camera using the difference program between the control program and the client computer to enable concurrent control by the client computer and presentation of the image data on a display associated with the client computer.

21. The method of claim 20, further comprising managing access of plural client computers that remotely control the camera, wherein a request from one of the plural client computers to control the camera is evaluated in accordance with prioritization information; and wherein the image data is provided to each of the plural computers while the one of the plural computers controls the camera.

\* \* \* \* \*